United States Patent
Kirkland

(10) Patent No.: US 7,484,175 B2
(45) Date of Patent: Jan. 27, 2009

(54) METHOD AND APPARATUS FOR INCREASING PERSONABILITY OF INSTANT MESSAGING WITH USER IMAGES

(75) Inventor: Dustin C. Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 10/675,673

(22) Filed: Sep. 30, 2003

(65) Prior Publication Data

US 2005/0071767 A1    Mar. 31, 2005

(51) Int. Cl.
*G06F 3/00* (2006.01)

(52) U.S. Cl. .................. 715/751; 715/752; 715/753; 715/754; 715/755; 715/756; 715/757; 715/758; 715/759

(58) Field of Classification Search .......... 715/751–759
See application file for complete search history.

(56) References Cited

U.S. PATENT DOCUMENTS

| | | | |
|---|---|---|---|
| 6,219,045 B1 * | 4/2001 | Leahy et al. ................ | 715/757 |
| 6,781,608 B1 * | 8/2004 | Crawford ................... | 715/758 |
| 6,990,452 B1 * | 1/2006 | Ostermann et al. ......... | 704/260 |
| 7,107,312 B2 * | 9/2006 | Hackbarth et al. ......... | 709/204 |
| 2002/0007276 A1 * | 1/2002 | Rosenblatt et al. ......... | 704/260 |
| 2002/0126135 A1 * | 9/2002 | Ball et al. .................. | 345/600 |
| 2002/0174188 A1 * | 11/2002 | Clark et al. ................ | 709/213 |
| 2005/0004993 A1 * | 1/2005 | Miller et al. ............... | 709/207 |

OTHER PUBLICATIONS

Cohen, Alan; "Instant Messaging", May 4, 1999, PC Magazine, p. 171.*

* cited by examiner

*Primary Examiner*—Tadesse Hailu
*Assistant Examiner*—Michael Roswell
(74) *Attorney, Agent, or Firm*—Duke W. Yee; Justin M. Dillon; Wayne P. Bailey

(57) ABSTRACT

A method, apparatus, and computer instructions for handling instant messages. In response to receiving an instant message, a determination is made as to whether a picture of a sender of the instant message is associated with the instant message, wherein the picture is located in a preexisting database of pictures. The picture with the message is displayed on a display in the data processing system, if the picture is associated with the message.

9 Claims, 4 Drawing Sheets

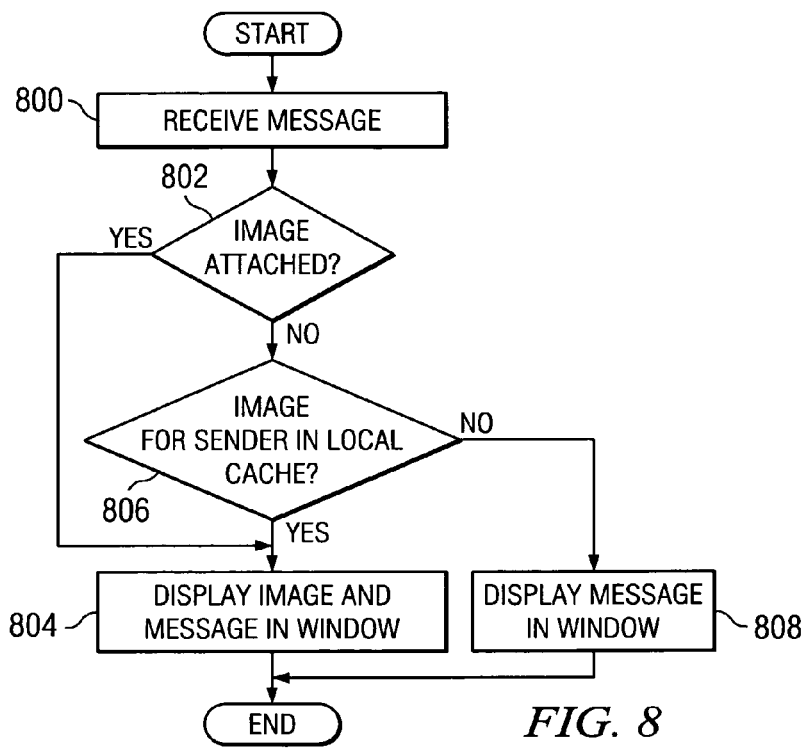
FIG. 8
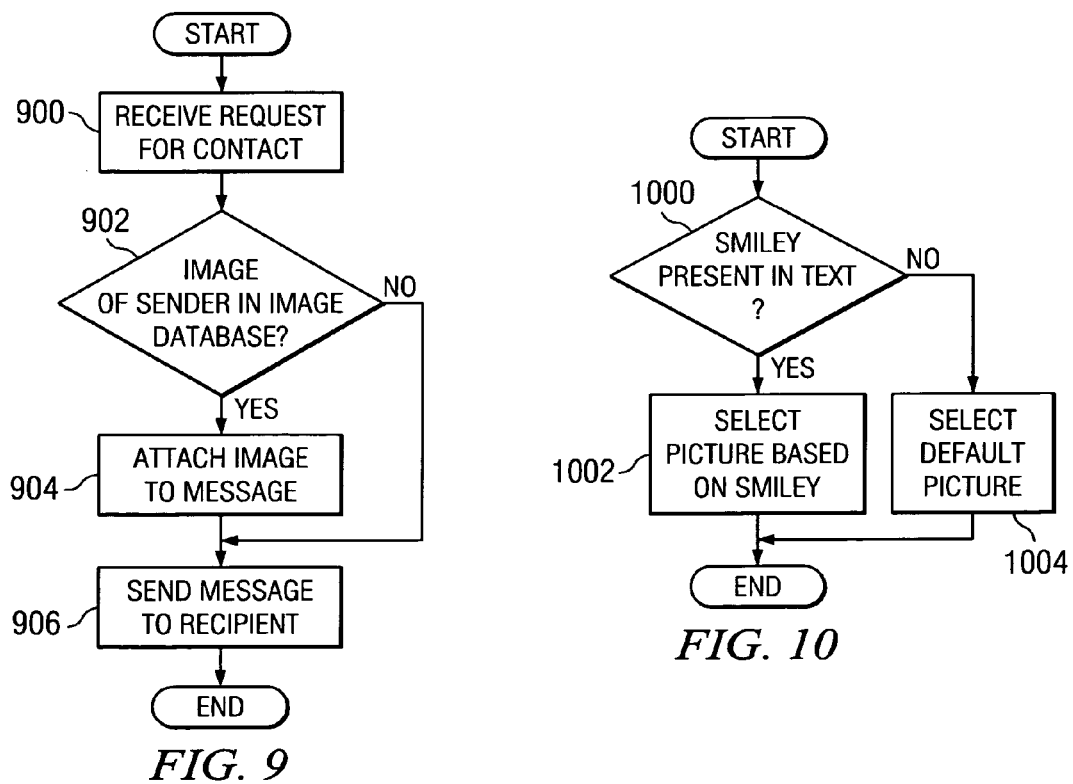
FIG. 9
FIG. 10

US 7,484,175 B2

METHOD AND APPARATUS FOR INCREASING PERSONABILITY OF INSTANT MESSAGING WITH USER IMAGES

BACKGROUND OF THE INVENTION

1. Technical Field

The present invention relates generally to an improved data processing system and in particular to a method and apparatus for processing and displaying messages in an instant messaging system. Still more particularly, the present invention provides an improved method, apparatus, and computer instructions for improving personability of instant messages with user images.

2. Description of Related Art

Instant messaging is an online chat medium, allowing users to communicate with each other and collaborate in real time over a network data processing system. Instant messaging is commonly used over the Internet. Instant messaging applications monitor and report the status of users that have established each other as online contacts. Additionally, instant messenger users may find additional contacts through various mechanisms. For example, a user may find other users based on a search for users with similar interests, such as school, investing, cars, and movies. The status in messages are typically presented to the user in a window on the user's data processing system. Instant messaging applications also are often employed by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality, and usability enhancement are important to the continued success of this type of communication tool.

One problem with instant messaging is that it is often impersonal. Particularly when working with someone that a user has never met, it is easy for the user to forget that person's name. Identifying the importance of a particular message may be difficult when a user has hundreds of contacts and may receive numerous messages during the day. As a result, if a message comes from that particular person, the importance of the message may be unknown to the user. As a result, instant messaging is a rough substitute for the experience of meeting someone in person or face-to-face. Therefore, it would be advantageous to have an improved method, apparatus, and computer instructions for improving the personability of instant messages.

SUMMARY OF THE INVENTION

The present invention provides a method, apparatus, and computer instructions for handling instant messages. In response to receiving an instant message, a determination is made as to whether a picture of a sender of the instant message is associated with the instant message, wherein the picture is located in a preexisting database of pictures. The picture with the message is displayed on a display in the data processing system, if the picture is associated with the message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart of a process for receiving a message in accordance with a preferred embodiment of the present invention;

FIG. 9 is a flowchart of a process for handling a message at an instant messaging server process in accordance with a preferred embodiment of the present invention; and FIG. 10 is a flowchart of a process for selecting images for a message in accordance with a preferred embodiment of the present invention.

DETAILED DESCRIPTION OF THE PREFERRED EMBODIMENT

Figure 1:
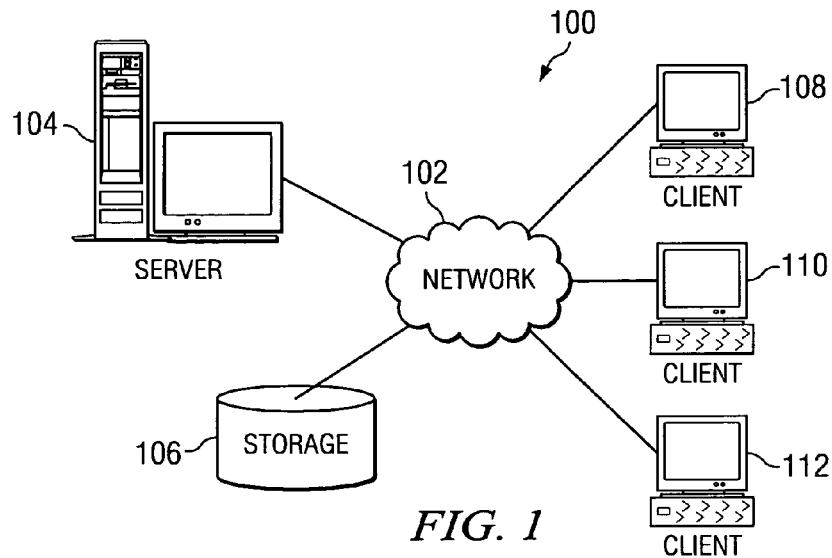
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Server 104 may act as an instant messaging server to facilitate the exchange of messages between users at clients, such as clients 108, 110, and 112. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
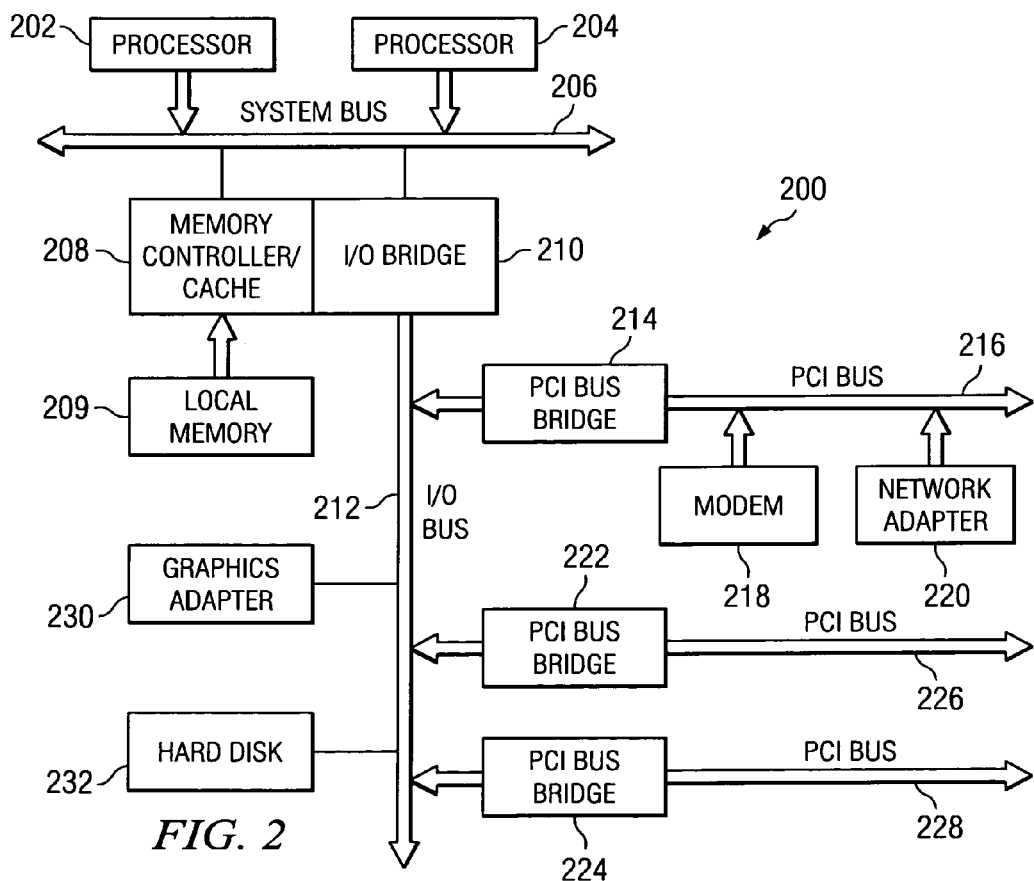
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
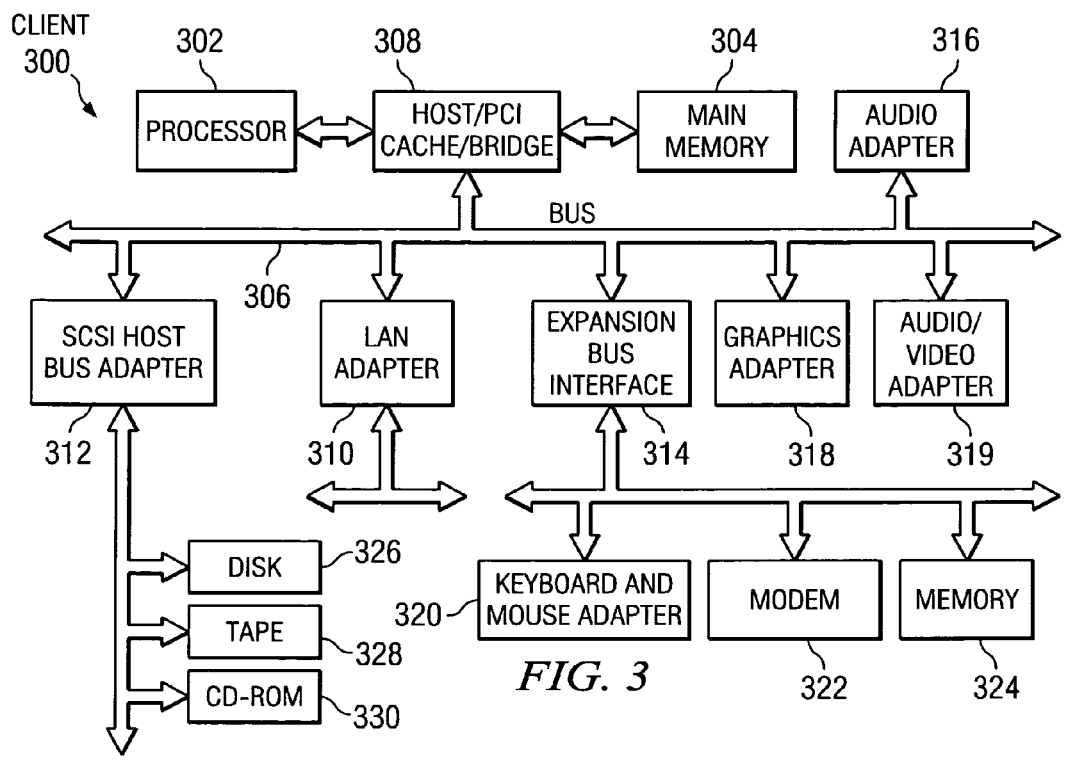
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for improving personability of instant messaging through the use of user images or pictures. The mechanism of the present invention attaches a picture of the user that is sent with an instant message to another user. Depending on the implementation, the picture may be sent only with the initial message. Additional pictures are sent if the user chooses to change the picture. These pictures may be those of the user and may change from time to time depending on what the user selects. When a message is received by a user, the picture is displayed along with the message by the instant messaging application. In this manner, the user may identify the sender of the message using the picture and associates some level of importance with the message without having to actually read the message.

Figure 4:
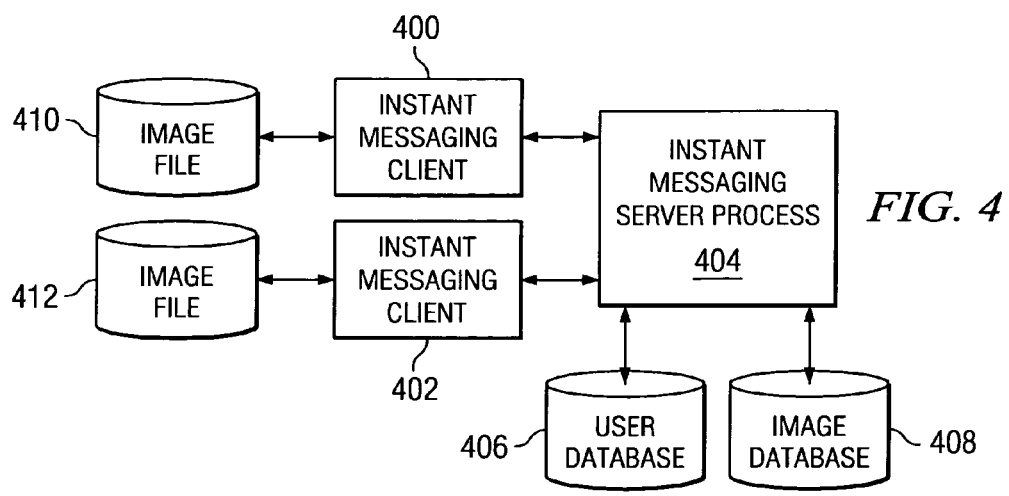
FIG. 4 is a block diagram illustrating components used in improving personability of instant messages with user images in accordance with a preferred embodiment of the present invention.

Turning now to FIG. 4, a block diagram illustrating components used in improving personability of instant messages with user images in accordance with a preferred embodiment of the present invention. In this illustrative example, a user at instant messaging client 400 may send or exchange messages with another user at instant messaging client 402. These instant messaging clients may be executing on a data processing system, such as data processing system 300 in FIG. 3. The exchange of messages in these examples is facilitated through instant messaging server process 404. This process allows for users to find other users within the instant messaging system as well as aid in the exchange of messages between different users.

Depending on the particular instant messaging system, instant messaging server process 404 may only be involved in providing an indication of when particular users are online and for establishing initial contacts while users contacting users already on a buddy list may contact those users directly after seeing that a particular user is online. Instant messaging server process 404 may be located on a server, such as data processing system 200 in FIG. 2.

In these examples, the different users registered to the instant messaging system are stored in user database 406. This user database provides information needed to search for and find other users as well as contact users when they are online. Additionally, image database 408 also is present within this system. This image database in these examples contains pictures or "mug shots" of users. In these examples, the images are typically small in size to avoid using too much bandwidth. For example, a 1 kb image may be used in these illustrative examples.

When a message is sent from one user to another user, instant messaging server process 404 may attach a picture to the message so that the picture is displayed in the instant messaging window provided by an instant messaging client.

In these illustrative examples, the image is sent only when the first message is sent from one user to another user during a particular session. The image may be resent at a later time if another session is established.

A user at instant messaging client 400 may take one or more pictures, which are stored in image file 410. These images may be sent to instant messaging server process 404 for storage in image database 408. Images in image database 408 are stored in association with user or screen names, with these names acting as an index to identify images for a particular user. Further, images received of another user may be stored in image file 410. In a similar fashion, image file 412 also contains images for the user at instant messaging client 402 as well as for storing messages received from another user. These image files act as a cache for the pictures. Of course, other types of data structures other than files may be used to cache images depending on the particular implementation.

Further, images from image database 408 may be stored within image file 410 or image file 412 to provide for local caching of the pictures. As a result, when a message is received from a particular user, the user identification or name may be used to match up a picture in image file 410 or image file 412 for display, without requiring transmission of the image each time a session is initiated. Image database 408 may be an existing database of images, such as a database of images used for badges within a company or business. In this manner, an existing set of images may be used with the mechanism of the present invention, without requiring an entire set of images to be generated for each user.

In this illustrative example, the images in the illustrative embodiment in image database 408 were originally created for a different purpose. In this case, this database of pictures was originally created as a corporate or business database for use in generating badges. Other types of databases containing pictures of users also may be used with the mechanism of the present invention. These images still may be used for the purpose of generating badges in these examples. In another example, BluePages is an IBM database of phone numbers e-mail addresses, and names. A persona database with images is linked to BluePages. This database is currently accessed through the Internet using a browser to provide employees information about other employees. Such a database may be used as image database 408. In this manner, an existing database of pictures created for a different purpose may be used in the messaging system of the present invention. If an existing database is not available, image database 408 may take the form of a new database created specifically for use with the mechanism of the present invention.

Figure 5:
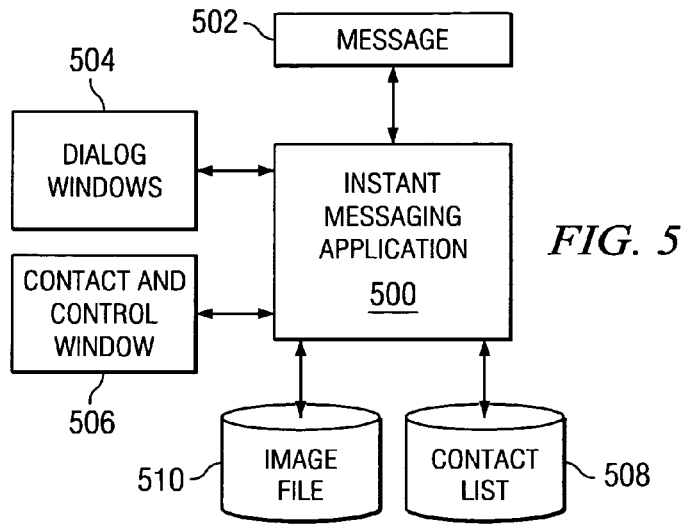
FIG. 5 is a diagram illustrating an instant messaging client in accordance with a preferred embodiment of the present invention.

Further, multiple images may be generated in which different images may be sent to database 408 or transmitted to another user depending on the selection made by the user. One picture may be, for example, a happy picture, another may be a serious picture, while another picture may be a perplexed picture. With these types of pictures, based on "smileys" found in the text, different images may be transferred to the recipient. Smileys are also referred to as "emoticons". These are expressions of an emotion typed into a message using standard keyboard characters. Illustrative examples may be viewed sideways as follows: :-) representing a smile,:-( representing a frown, and ;-) representing a wink. Thus, depending on the particular picture associated with a smiley or emoticon, a selected picture may be sent to the recipient of a message in the instant messaging system. Turning next to FIG. 5, a diagram illustrating an instant messaging client is depicted in accordance with a preferred embodiment of the present invention. The components illustrated in FIG. 5 may be found in an instant messaging client, such as instant messaging client 400 or 402 in FIG. 4. These components may be implemented in a data processing system, such as data processing system 300 in FIG. 3.

In the illustrative example, instant messaging application 500 processes messages, such as message 502, received from users located on remote data processing systems. As messages are received, these messages are presented in dialog windows 504. Additionally, dialog windows 504 provide an interface for a user to input text to send messages to other users.

Contact and control window 506 is presented by instant messaging application 500 to provide the user with a list of user names, as well as other information. Additionally, a small picture or thumbnail of each person on the contact list may be displayed in association with the persons on the list. This other information may include, for example, identifying other users that are currently online. Contact and control window 506 also provides an interface to allow a user to set different preferences. For example, the user may set passwords required to access different names used in instant messaging sessions.

Also, a user may employ contact and control window 506 to set other preferences, such as colors and fonts used in instant messaging application 500. These preferences also may include whether a picture is to be sent when a session is initiated with another user. Depending on the implementation, the preference may be set to allow a user who receives messages to retrieve images of the senders from a remote database or a local cache.

Further, a list of names presented by contact and control window 506 are stored in contact list 508 in these examples. Additional user or screen names may be added to or deleted from contact list 508. This contact list is employed in presenting the list of names within contact and control window 506. Further, image file 510 is accessed by instant messaging application 500 in sending or receiving pictures that are displayed in association with messages in these examples.

A user may select a graphical control to set a preference to send and display pictures when instant messaging sessions occur. These pictures are used to provide the user with additional personability when instant messages are exchanged.

Figure 6:
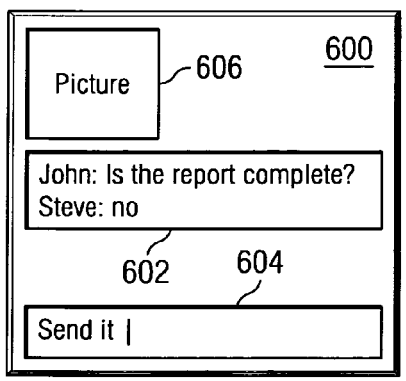
FIG. 6 is a diagram illustrating an example of a messaging window in accordance with a preferred embodiment of the present invention.

With reference now to FIG. 6, a diagram illustrating an example of a messaging window is depicted in accordance with a preferred embodiment of the present invention. In these examples, messaging window 600 is an example of a messaging window within dialog windows 504 in FIG. 5. Messaging window 600 is displayed when a message is received from another user.

In this example, messaging window 600 includes chat history section 602 and message input section 604. Chat history section 602 is used to display messages exchanged with a remote user. Message input section 604 allows a user to input text for sending a message to a remote user.

Picture 606 is a display of a picture of a person for a current chat session. With the use of picture 606, the user may identify or relate some amount of importance with the message received from that remote person, without having to read the message. This type of personability feature is especially useful in providing additional information for users that remember faces better than names. Further, a user may be across the room or far enough away from the display when a message arrives such that the user is unable to read the message. With the image from the sender, the user may be able to decide the importance of the message without actually having to read the message.

Window 600 is presented for purposes of illustration and not meant as a limitation as to how pictures or images may be displayed in association with messages. For example, picture 606 may be displayed in a separate window from window 600 depending on the particular implementation.

Figure 7:
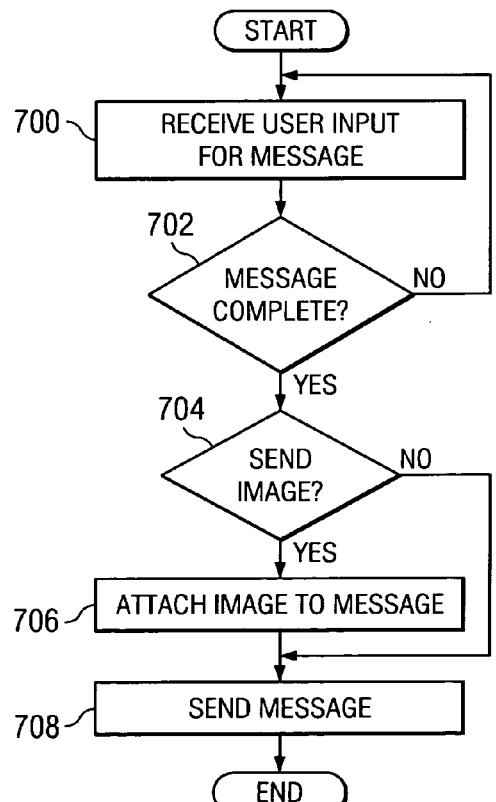
FIG. 7 is a flowchart of a process for generating an instant message in accordance with a preferred embodiment of the present invention.

Turning next to FIG. 7, a flowchart of a process for generating an instant message is depicted in accordance with a preferred embodiment of the present invention. The process illustrated in FIG. 7 may be implemented in an instant messaging application, such as instant messaging application 500 in FIG. 5. This particular process is typically used when a message is first sent to a person from the user.

The process begins by receiving user input for the message (step 700). Next, a determination is made as to whether the message is complete (step 702). If the message is not complete, the process returns to step 700. Otherwise, a determination is made as to whether an image is to be sent (step 704). This determination may be made by checking a preference selected by the user or by determining whether an image or picture is present for the user. If an image is to be sent, the image is attached to the message (step 706), and the message is then sent to the recipient (step 708) with the process terminating thereafter. Turning back to step 704, if an image is not to be sent, the process proceeds directly to step 708 without attaching an image, with the process terminating thereafter.

Depending on the particular implementation, the image may actually be attached by the server process rather than at the client side application. In this case, the message then includes an indication that an image is to be attached to the message sent to the recipient.

Turning now to FIG. 8, a flowchart of a process for receiving a message is depicted in accordance with a preferred embodiment of the present invention. The process illustrated in FIG. 8 may be implemented in an instant message application, such as instant messaging application 500 in FIG. 5.

The process begins by receiving a message (step 800). A determination is made as to whether an image is attached to the message (step 802). If an image is attached, the image is displayed along with the message in a window (step 804). This window is similar to window 600 in FIG. 6.

With reference again to step 802, if an image is not displayed, a determination is made as to whether the image for the sender of the message is located in a local cache (step 806). The local cache may be, for example, image file 410 in FIG. 4. If the image is located in a local cache, the process proceeds to step 804 as described above. Local caching of images may save on bandwidth usage. Otherwise, the message is displayed in the window without a picture (step 808) with the process terminating thereafter.

Turning next to FIG. 9, a flowchart of a process for handling a message at an instant messaging server process is depicted in accordance with a preferred embodiment of the present invention. The process illustrated in FIG. 9 may be implemented in an instant messaging server process, such as instant messaging server process 404 in FIG. 4.

The process begins by receiving a request for a contact (step 900). This request may be to initiate a session with a person listed as a contact for an instant messaging client. A determination is made as to whether an image of the sender is present in an image database (step 902). This image database may be, for example, image database 408 in FIG. 4. If an image of the sender is present, the image is attached to the message (step 904).

Thereafter, the message is sent to the recipient (step 906) with the process terminating thereafter. With reference again to step 902, if an image is not present, the process proceeds to step 906 to send the message to the recipient without attaching an image. The process then terminates.

With reference now to FIG. 10, a flowchart of a process for selecting images for a message is depicted in accordance with a preferred embodiment of the present invention. The process illustrated in FIG. 10 may be implemented in an instant messaging application, such as instant messaging application 500 in FIG. 5. This process may be implemented to select an image from a group of images to be sent with a messaging program. In these examples, the image is selected based on a smiley or emoticon that may be present in the text.

The process begins by determining whether a smiley is present in the text (step 1000). If a smiley is present, a picture is selected based on the smiley (step 1002) with the process terminating thereafter. If a smiley is not present in step 1000, the process selects a default picture (step 1004) with the process terminating thereafter. In this manner, the message displayed in the window may change depending on the particular smiley or emoticon used by a user. Additionally, the particular picture selected also may be changed based on other types of indicators other than smileys depending on the particular implementation.

Thus, the present invention provides an improved method, apparatus, and computer instructions for improving personability of instant messages through the use of user images. In these examples, pictures are displayed with instant messages so that a user receiving an instant message from another person can have a visual identification of that person in addition to merely a name on a contact list. In this manner, an advantage is provided for people who remember faces better than names. Further, the importance of a message also may be identified without reading the message when a picture is presented with the message. These pictures may be obtained in different ways, such as, for example, from the sender with the message, from a locale cache, or from a database on a remote server.

Additionally, other features may be implemented with this particular instant messaging system. For example, other features, such as blocking pictures, may be employed. With this feature, a user may block the transfer of the user's image to another recipient.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for handling instant messages, the method comprising:
   responsive to receiving an instant message, determining whether a picture of a sender of the instant message is associated with the instant message, wherein the picture image of the sender is located in at least one of a local cache on the data processing system and a preexisting database of pictures on a remote data processing system as determined by a user selected preference, and wherein the determining step is automatically performed by an instant messaging process of a receiver of the instant message that determines whether the picture image of the sender is in the local cache or the preexisting database of pictures; and
   displaying the picture image of the sender with the instant message on a display in the data processing system if the picture image of the sender is associated with the instant message, wherein the picture image of the sender is stored in the preexisting database on the remote data processing system, and the preexisting database is used to provide pictures of users for a different user identification purpose other than instant messaging.

2. The method of claim 1, wherein the picture image of the sender and the instant message are displayed in a single window, and wherein the picture image of the sender is a mug shot of the sender.

3. The method of claim 1, wherein the user selected preference is local, and wherein the picture image of the sender is not received with the instant message but instead was previously received with another message previously sent to the data processing system from the sender and stored in the local cache on the data processing system.

4. A data processing system for handling instant messages, the data processing system comprising:
   a bus system;
   a communications unit connected to the bus system;
   a memory connected to the bus system, wherein the memory includes a set of instructions; and
   a processing unit connected to the bus system, wherein the processing unit executes the set of instructions to determine whether a picture image of a sender of the instant message is associated with the instant message in response to receiving an instant message, wherein the picture image of the sender is located in a preexisting database of pictures, and display the picture image with the instant message on a display in the data processing system if the picture image of the sender is associated with the instant message on a display in the data processing system if the picture image of the sender is associated with the instant message, wherein the picture image of the sender is attached to the instant message by a separate server data processing system, while the instant message is in transit from the sender to the data processing system, as determined by an indicator in the instant message, wherein the picture image of the sender is stored in the preexisting database on the remote data processing system, and the preexisting database is used to provide pictures of users for a different user identification purpose other than instant messaging, and wherein the picture image of the sender is a mug shot of the sender.

5. A data processing system for handling instant messages, the data processing system comprising:
   determining means, responsive to receiving an instant message, for determining whether a picture image of a sender of the instant message is associated with the instant message, wherein the picture image of the sender is located in at least one of a local cache on the data processing system and a preexisting database of pictures on a remote data processing system as determined by a user selected preference, and wherein the determining means is an instant messaging process of a receiver of the instant message that automatically determines whether the picture image of the sender is in the local cache or the pre-existing database of the pictures; and
   displaying means for displaying the picture image of the sender with the instant message on a display in the data processing system if the picture image of the sender is associated with the instant message, wherein the picture image of the sender is stored in the preexisting database on the remote data processing system, and the preexisting database is used to provide pictures of users for a different user identification purpose other than instant messaging.

6. The data processing system of claim 5, wherein the picture image of the sender and the instant message are displayed in a single window, and wherein the picture image of the sender is a mug shot of the sender.

7. A computer program product in a computer readable medium for handling instant messages in a data processing system, the computer program product comprising:
   first instructions, responsive to receiving an instant message, for determining whether a picture image of a sender of the instant message is associated with the instant message, wherein the picture image of the sender is located in at least one of a local cache on the data processing system and a preexisting database of pictures on a remote data processing system as determined by a user selected preference, and wherein the determining is automatically performed by an instant messaging process of a receiver of the instant message that determines whether the picture image of the sender is in the local cache or the preexisting database of pictures; and
   second instructions for displaying the picture image of the sender with the instant message on a display in the data processing system if the picture image of the sender is associated with the instant message, wherein the picture image of the sender is stored in the preexisting database on the remote data processing system, and wherein the preexisting database is maintained separately from a generic icon database and the preexisting database is used to provide pictures of users for a different user identification purpose other than instant messaging.

8. The computer program product of claim 7, wherein the picture image of the sender and the instant message are displayed in a single window, and wherein the picture image of the sender is a mug shot of the sender.

9. The computer program product of claim 7, wherein the picture image of the sender in the preexisting database also is used for a different user identification purpose other than instant messaging.

* * * * *